3,816,396
THIOCOLCHICINE GLUCOSIDE
Roland Bardoneschi, Le-Vert-Galant, and Georges Muller, Nogent-sur-Marne, France, assignors to Roussel-UCLAF, Paris, France
No Drawing. Filed Apr. 27, 1972, Ser. No. 248,138
Int. Cl. C07c 48/18
U.S. Cl. 260—210 R                                   3 Claims

ABSTRACT OF THE DISCLOSURE

A novel process for the preparation of glucoside derivatives of thiocolchicine of the formula

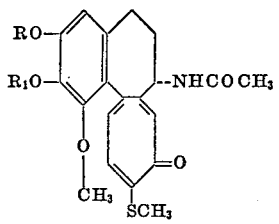

wherein one of $R_1$ and R is glucosyl and the other is methyl and to novel products produced therein, which have anti-contracturant activity.

STATE OF THE ART

Thiocolchicoside or 3-glucose-2-yl-3-demethylthiocolchicine (of formula I wherein $R_1$ is methyl and R is glucose-2-yl) and its preparation is described in French Pat. No. 1,113,761, but this process uses colchicoside as the starting material which is one of the least abundant colchic alkaloids.

OBJECTS OF THE INVENTION

It is an object of the invention to provide a novel process for the preparation of the compounds of formula I beginning with readily available materials.

It is another object of the invention to provide the novel product, 2-glucose-2-yl-2-demethyl-thiocolchicine and novel intermediates.

It is a further object of the invention to provide novel anti-contracturant compositions.

These and other objects and advantages of the invention will become obvious from the following detailed description.

THE INVENTION

The novel process of the invention for the preparation of the thiocolchine derivatives of the formula

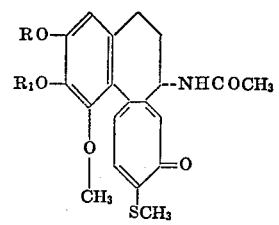

wherein one of $R_1$ and R is glucosyl and the other is methyl comprises reacting thiocolchicine with boron tribromide to form a mixture of 1,2-bis-demethyl-thiocholcine and 2,3-bis-demethyl-thiocolchicine with the 2,3-isomer being predominant, reacting the said mixture with acetobromoglucose in the presence of a tertiary base to form a mixture of 2-tetraacetoglucose-2-yl-2,3-bis-demethylthiocolchicine, 3-tetraacetoglucose-2-yl-2,3-bis-demethylthiocolchicine and 2-tetraacetoglucose-2-yl-1,2-bis-demethyl-thiocolchicine, reacting the said mixture with diazomethane and then with a base to obtain a mixture of 3-glucose-2-yl-3-demethyl-thiocolchicine and 2-glucose-2-yl-2-demethyl-thiocolchicine which may be separated into its individual components by known physical means.

The reaction of thiocolchicine with boron tribromide may be effected in an organic solvent non-reactive with the boron tribromide, preferably a chlorinated solvent such as methylene chloride. The condensation of acetobromoglucose with the mixture of thiocolchicine derivatives is effected in the presence of a tertiary base such as pyridine, triethylamine or an alkali metal carbonate or alkali metal hydroxide. The said condensation is preferably effected in an aqueous media in the presence of an organic solvent such as dioxane.

The condensation of diazomethane with acetyl glucosides is effected in one or more organic solvents such as methanol or methylene chloride. After the diazomethane reaction and treatment with the base, the unreacted thiocolchicine is removed and the mixture of 3-glucose-2-yl-3-demethyl-thiocolchicine and 2-glucose-2-yl-2-demethyl-thiocolchicine can be separated into its individual components, preferably by chromatography or by crystallization from a convenient organic solvent or mixtures thereof.

The demethylation of thiocolchicine with boron tribromide is the process step which merits attention as it has a particularly unexpected character. The demethylation of thiocolchicine in the 1-position with stannic chloride or in the 2-position with aluminum chloride is known but it has not been known to demethylate thiocolchicine in the 3-position without touching the methoxy in the 1- or 2-position.

The reaction of boron tribromide with thiocolchicine results mostly in 2,3-bis-demethyl isomer with the methoxy still in the 1-position. As a result of the predominance of the 1-methoxy isomer, the methoxy in the 1-position blocks the phenol function in the 2-position so that most of the glucosation occurs with the phenol in the 3-position. Chromatographic analysis shows that one obtains 1 part of the 3-glucosyl isomer for 2 parts of the 2-glucosyl isomer when in the case of the 3-hydroxy functions are free, glucosation does not give 20% of 3-glucosyl isomer to 80% of the 2-glucosyl isomer. The process has the advantage of resulting in a mixture of glucosyl derivatives richer in the 3-glucosyl isomer and permits demethylation without touching the acetoamido group.

The thiocolchicine used as the starting material is easily obtained from colchicine such as described in French Pat. No. 1,113,761 which itself is more abundant in colchic alkaloids than colchicoside (about ⅔ of colchicine to ⅓ colchicoside).

The novel compound, 2-glucose-2-yl-2-demethylthiocolchicine, has an interesting anti-contracturant action. It can be administered orally or transcutaneously.

The novel anti-contracturant compositions of the invention are comprised of an effective amount of 2-glucose-2-yl-2-demethyl-thiocolchicine and a pharmaceutical carrier. The compositions may be in the form injectable solutions or suspensions in ampoules or multiple dose flacons, or in the form of sterile powders for dissolution in the appropriate solvent at the time of use, tablets, coated tablets, ointments or creams prepared in the usual manner.

The said compositions are useful, because of their anti-contracturant activity, for the treatment of cramps, lumbago, wrynecks, sciatica, lamenesses, and dysmenorrhea.

The pharmaceutical formulations such as: tablets, injectable solutions or suspensions, sterile powders, ointments and creams are prepared according to the usual techniques.

The 2-glucose - 2 - yl - 2 - demethyl-thiocolchicine also possesses anti-mitotic activity allowing it to be employed in horticulture. It can be used in agriculture for modifications of mitosis and the creation of polyploids either by sprinkling aqueous solutions or suspensions of the products on cultivated soil or by previous treatment of the seed with the product either pure or diluted in a solvent or on a support.

In the following examples, there are described several preferred embodiments to illustrate the invention. However, it should be understood that the invention is not intended to be limited to the specific embodiments.

EXAMPLE

Step A: Mixture of 1,2-bis-demethyl-thiocolchine and 2,3-bis-demethyl-thiocolchicine A solution of 8.7 ml. of boron tribromide in 125 ml. of methylene chloride was added over 25 minutes at −5° C. to a solution of 12.45 g. of thiocolchicine in 125 ml. of methylene chloride and after heating to 25° C., the mixture was stirred for 3 hours at this temperature. The mixture was added to an ice-water mixture, stirred for 10 minutes and was then poured into an aqueous sodium chloride solution. The aqueous phase was extracted with methylene chloride containing 30% of ethanol and the organic extracts were washed with an aqueous sodium chloride solution, then dried and concentrated to dryness by distillation under reduced pressure to obtain 13 g. of a mixture of 1,2-bis-demethyl-thiocolchicine and 2,3-bis-demethyl-thiocolchicine which was used as is for the next step. The mixture can be separated into its individual constituents by chromatography to obtain 10% of 1,2-bis-demethyl-thiocolchicine and 50% of 2,3-bis-demethyl-thiocolchicine.

Step B: 2-tetraacetoglucose - 2 - yl - 2,3 - bis-demethyl-thiocolchicine and 3 - tetraacetoglucose - 2 - yl-2,3-bis-demethyl-thiocolchicine and 2-tetraacetoglucose - 2 - yl-1,2-bis-demethyl-thiocolchicine mixture 13 g. of the mixture obtained in Step A were dissolved in a mixture of 250 ml. of water and 125 ml. of dioxane and after cooling the solution to 5° C., 56 ml. of triethylamine and then a solution of 74 g. of acetobromoglucose in 125 ml. of dioxane were added thereto. The mixture was stirred for 16 hours at 20° C. under a nitrogen atmosphere and then was added to an aqueous sodium chloride solution. The mixture was extracted with methylene chloride and the methylene chloride extracts were washed with an aqueous sodium bicarbonate solution, then dried and concentrated to dryness by distillation under reduced pressure to obtain a mixture of 2-tetraacetoglucose - 2 - yl - 2,3 - bis-demethyl-thiocolchicine, 3-tetraacetoglucose - 2 - yl - 2,3 - bis-demethyl-thiocolchicine and 2 - tetraacetoglucose - 2 - yl - 1,2 - bis-demethyl-thiocolchicine which was used as is for the next step.

Step C: 3-glucose-2-yl-3-demethyl-thiocolchicine and 2-glucose-2-yl-2-demethyl-thiocolchicine The mixture obtained in Step B was dissolved in 150 ml. of methanol and after cooling the solution to 5° C., 300 ml. of a methylene chloride solution containing 2% of diazomethane were added thereto. The mixture was stirred for 30 minutes at 5° C. and then was concentrated to 150 ml. by distillation under reduced pressure. 150 ml. of an aqueous 2 N sodium hydroxide solution was added thereto and the mixture was stirred for 30 minutes. The mixture was added to water and then was extracted with methylene chloride. The methylene chloride extracts were washed with water, dried and concentrated to dryness by distillation under reduced pressure to obtain 1.7 g. of thiocolchicine from unreacted products.

The combined aqueous phases were saturated with sodium chloride and then were extracted with chloroform containing 40% ethanol. The organic extracts were washed with an aqueous sodium chloride solution, dried, treated with activated carbon and concentrated to dryness under reduced pressure. The residue was added to ethanol which was distilled off to obtain 9.7 g. of a mixture of 3-glucose-2 - yl - 3 - demethyl - thiocolchicine and 2 - glucose-2-yl-2-demethyl-thiocolchicine.

The 9.7 g. of the said mixture were added to a mixture of 50 ml. of ethanol and 20 ml. of methylene chloride and the mixture was filtered to remove insolubles. The filtrate was concentrated to about 20 ml. and then allowed to stand. The precipitate was recovered by vacuum filtration, was washed with ethanol and dried to obtain 3.17 g. of 3 - glucose - 2 - yl - 3 - demethyl-thiocolchicine (or thiocolchicoside) identical to the product described in French Pat. No. 1,113,761. The mother liquor from the crystallization was concentrated to dryness and the residue was chromatographed to obtain 2-glucose-2-yl-2-demethyl-thiocolchicine.

Various modifications of the process and products of the invention may be made without departing from the spirit or scope thereof and it is to be understood that the invention is to be limited only as defined in the appended claims.

We claim:
1. A process for the preparation of thiocolchicine derivatives of the formula

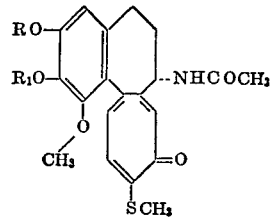

wherein one of $R_1$ and R is glucosyl and the other is methyl consisting essentially of reacting thiocolchicine with boron tribromide to form a mixture of 1,2-bis-demethyl-thiocolchicine and 2,3-bis-dimethyl-thiocolchicine with the 2,3-isomer being predominant, reacting the said mixture with acetobromoglucose in the presence of a tertiary base to form a mixture of 2 - tetraacetoglucose-2-yl-2,3-bis-demethyl-thiocolchicine, 3 - tetraacetoglucose-2-yl-2,3-bis-demethyl-thiocolchicine and 2-tetraacetoglucose-2-yl-1,2-bis-demethyl-thiocolchicine, reacting the said mixture with diazomethane and then with a base to obtain a mixture of 3 - glucose - 2-yl-3-demethyl-thiocolchicine and 2-glucose-2-yl-2-demethyl-thiocolchicine which may be separated into its individual components.

2. The process of claim 1 wherein the reaction of thiocolchicine with boron tribromide is effected in a chlorinated organic solvent, to form a mixture of 1,2-bis-demethyl thiocolchicine and 2,3-bis-demethyl-thiolcolchicine with the 2,3-isomer being predominant.

3. A mixture of 2 - tetraacetoglucose - 2-yl-2,3-bis-demethyl-thiocolchicine, 3 - tetraacetoglucose-2-yl-2,3-bis-demethyl-thiocolchicine and 2-tetraacetoglucose-2-yl-1,2-bis-demethylthiocolchicine.

References Cited
UNITED STATES PATENTS 2,811,554  10/1957  Muller et al. ____ 260—562 Cl
2,820,029  1/1958   Muller et al. _____ 260—562 Cl JOHNNIE R. BROWN, Primary Examiner U.S. Cl. X.R.

260—562 Cl; 424—180